United States Patent
Brown

(10) Patent No.: US 6,675,921 B2
(45) Date of Patent: Jan. 13, 2004

(54) VEHICLE RADIATOR SUPPORT STRUCTURE

(75) Inventor: Daniel J. Brown, Northville, MI (US)

(73) Assignee: Custom Molders, Inc., Durham, NC (US)

( * ) Notice: Subject to any disclaimer, the term of this patent is extended or adjusted under 35 U.S.C. 154(b) by 202 days.

(21) Appl. No.: 09/845,878

(22) Filed: Apr. 30, 2001

(65) Prior Publication Data

US 2002/0157885 A1 Oct. 31, 2002

(51) Int. Cl.[7] ................................................ B60K 11/04
(52) U.S. Cl. ........................................ 180/68.4; 165/67
(58) Field of Search ............................... 180/68.4, 68.6, 180/312; 248/629, 632, 634, 213.3, 609; 165/67; 267/140.5, 141

(56) References Cited

U.S. PATENT DOCUMENTS

| | | | |
|---|---|---|---|
| 4,579,184 A | * 4/1986 | Hiramoto ..................... | 165/67 |
| 4,766,968 A | 8/1988 | Matsunaga | |
| 4,770,234 A | * 9/1988 | Hiraoka et al. ............... | 165/67 |
| 4,773,496 A | * 9/1988 | Brielmair ..................... | 180/68.4 |
| 5,040,627 A | * 8/1991 | Swayze ........................ | 180/68.5 |
| 5,205,349 A | 4/1993 | Nagao et al. | |
| 5,269,367 A | * 12/1993 | Susa et al. .................... | 165/140 |
| 5,544,714 A | * 8/1996 | May et al. ..................... | 165/67 |
| 5,785,140 A | * 7/1998 | Suzuki et al. ................. | 165/67 |
| 5,996,684 A | * 12/1999 | Clifton et al. ................ | 165/121 |
| 6,260,609 B1 | * 7/2001 | Takahashi ..................... | 165/67 |
| 6,349,928 B1 | * 2/2002 | Ko ................................ | 165/69 |
| 6,412,581 B2 | * 7/2002 | Enomoto et al. ............. | 165/69 |
| 2001/0001994 A1 | * 5/2001 | Enomoto et al. ........... | 180/68.4 |
| 2002/0056541 A1 | * 5/2002 | Kokubunji et al. ........... | 165/67 |
| 2002/0063003 A1 | * 5/2002 | Cristante et al. ........... | 180/68.4 |

* cited by examiner

Primary Examiner—Brian L. Johnson
Assistant Examiner—J. Allen Shriver
(74) Attorney, Agent, or Firm—Carlson, Gaskey & Olds

(57) ABSTRACT

A radiator mounting bracket assembly includes a mounting bracket and a vibration isolator. The vibration isolator is mounted within an opening formed in the bracket to engage a mounting pin which extends from an upper surface of a radiator. The mounting bracket is preferably formed of a non-metallic material such as glass-filled polypropylene and a plurality of ribs in the upper surface of the mounting bracket increase the structural rigidity thereof. The vibration isolator is a substantially annular member which receives the mounting pin while providing a pad section to engage the upper surface of the radiator. A rigid, yet vibration isolating retention is thereby achieved.

27 Claims, 2 Drawing Sheets

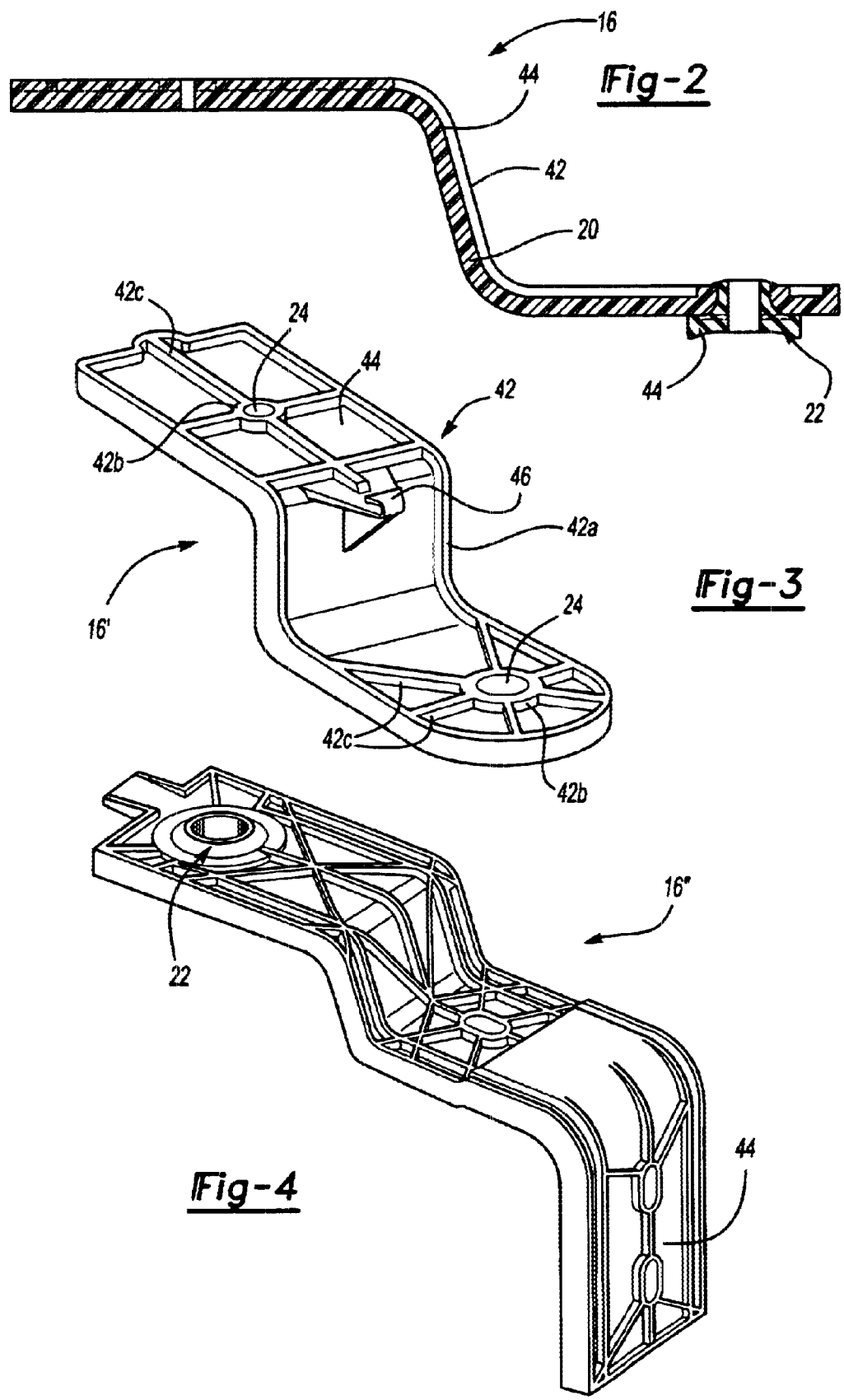

VEHICLE RADIATOR SUPPORT STRUCTURE

BACKGROUND OF THE INVENTION

The present invention relates to a support structure for a vehicle radiator assembly, and more particularly to a vibration isolating non-metallic radiator mounting bracket.

Various mounting arrangements for vehicle radiator assemblies are known. As the radiator is typically a rather heavy component, retention of the radiator assembly requires a solid support. Typically, a plurality of metal brackets are welded to a vehicle frame and the radiator assembly is attached thereto by threaded fasteners. Disadvantageously, welding requires an increased number of working steps during vehicle assembly.

Further, conventional mounting arrangements typically require threaded fasteners to assure a secure mount between the bracket and the radiator assembly. In many instances, the threaded fasteners may work lose which may result in vibration. Complex attachment arrangements are thus typically required to minimize vibration.

Accordingly, it is desirable to provide a support structure for a vehicle radiator assembly which providing a secure vibration isolating mounting arrangement.

SUMMARY OF THE INVENTION

The radiator mounting bracket assembly according to the present invention includes a mounting bracket and a vibration isolator. The vibration isolator is mounted within an opening formed in the mounting bracket to engage a mounting pin which extends from an upper surface of a radiator.

The mounting bracket is formed of a non-metallic material such as glass-filled polypropylene. The mounting bracket is a substantially step-shaped member which steps down from the vehicle frame to the upper portion of the radiator to exerts a force upon the radiator to drive the radiator toward a lower attachment point. A plurality of ribs in the upper surface of the mounting bracket are provided to increase the structural rigidity thereof.

The vibration isolator is a substantially annular member which receives the mounting pin while providing a pad section to engage the upper surface of the radiator. A rigid, yet vibration isolating retention is thereby achieved.

Another embodiment of the mounting bracket provides an integral retainer. The retainer is preferably a hook-like member which extends from the mounting bracket in a cantilevered arrangement to retain vehicle conduits, cables, hood rods or the like.

The present invention therefore provides a support structure for a vehicle radiator assembly which achieves a secure vibration isolating mounting arrangement.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 2 is a sectional view taken along the line 2—2 of the radiator mounting bracket illustrated in FIG. 1;

FIG. 3 is an expanded perspective view of another radiator mounting bracket; and FIG. 4 is an expanded perspective view of yet another radiator mounting bracket designed according to the present invention.

DETAILED DESCRIPTION OF THE PREFERRED EMBODIMENT

Figure 1:
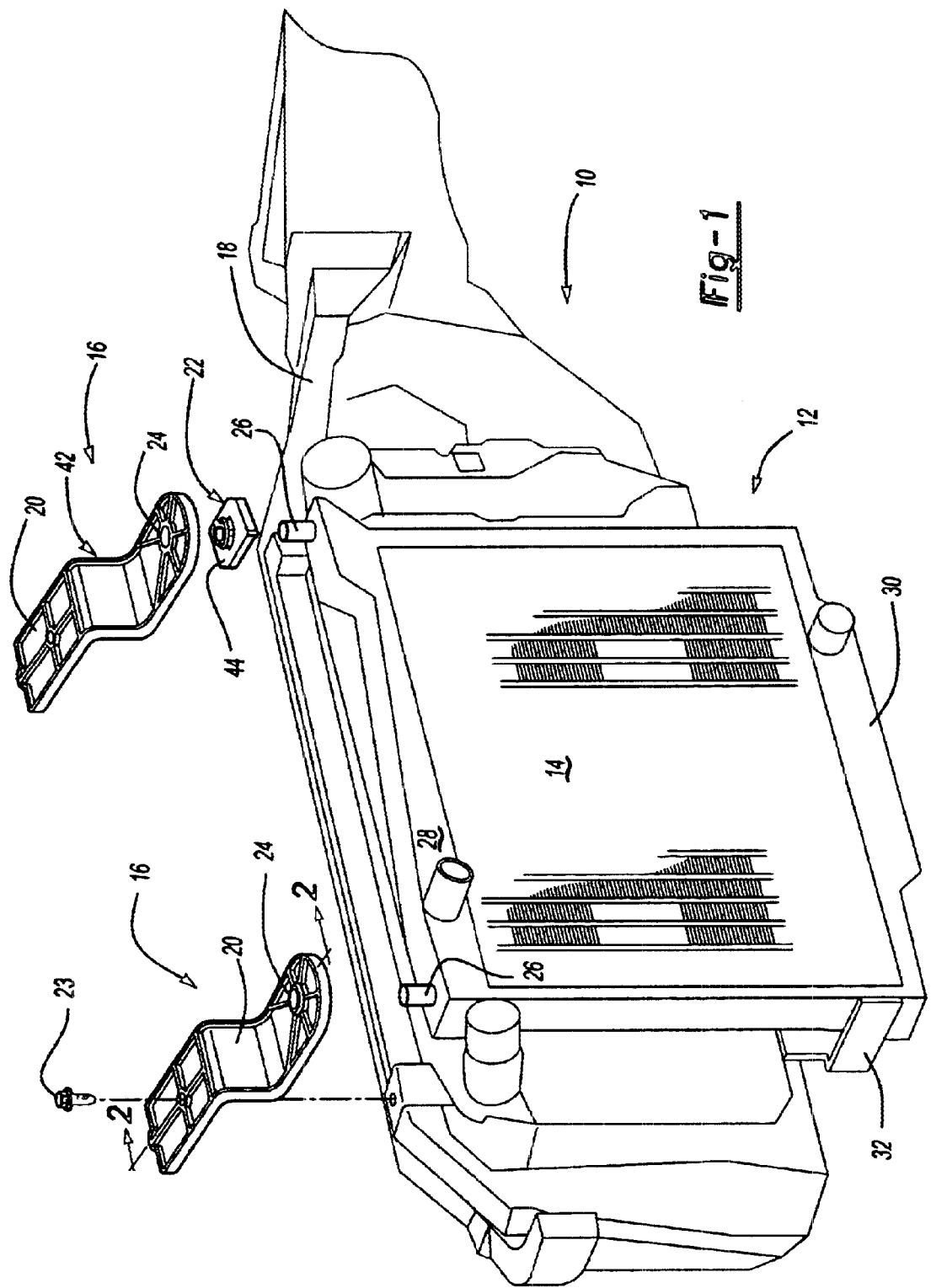
FIG. 1 is a general exploded view of a radiator designed according to the present invention.

FIG. 1 illustrates a general exploded view of a vehicle engine compartment 10 having a radiator assembly 12. The radiator assembly 12 includes a radiator 14 and a mounting bracket assembly 16 which attaches the radiator 14 to the vehicle frame 18. The mounting bracket assembly 16 preferably includes a mounting bracket 20 and a vibration isolator 22. The vibration isolator 22 is removably mounted within an opening 24 formed in each bracket 20. The bracket 20 is mounted to the vehicle member 18 such as a vehicle frame member by threaded fasteners 23 such as bolts or the like. It should be understood that the bracket 16 may be formed directly into a component within the entire compartment 10. That is, the bracket 16 is not a separate component. This arrangement may be particularly advantageous as a greater number of engine compartment components are being manufactured from non-metallic components.

The radiator 14 preferably includes a mounting pin 26 or the like which are received by the vibration isolator 22. The vibration isolator 22 is preferably formed of a resilient material such as a thermoplastic rubber, Nitrile, Santroprene, or the like. The mounting pins 26 extend from an upper portion 28 of the radiator 14 while the lower portion 30 of the radiator 14 includes a lower support 32 which affix the radiator 14 to the vehicle frame 18. It should be understood that the terms "upper" and "lower" are in reference to the normal orientation of the radiator 14 relative to the ground and should not be considered limiting in orientation. Preferably, the lower portion 30 of the radiator 14 is mounted upon a lower support 32 rigidly attached to the vehicle frame 18, however, other lower supports, including additional non-metallic mounts according to the present invention will benefit from the present invention.

Referring to FIG. 2, the mounting bracket 20 is preferably formed of a non-metallic material such as glass-filled polypropylene. The mounting bracket 20 is a substantially step-shaped member which steps down from the vehicle frame 18 to the upper portion 28 of the radiator 14. A plurality of ribs 42 (also shown in FIG. 1) are formed into a planar surface 44 of the mounting bracket assembly 16 to increase the structural rigidity thereof. It should be understood that other configurations of the ribs 42 will also benefit from the present invention, however, it is preferred that the ribs 42 provide rigidity in direction substantially parallel to the radiator 14 (FIG. 1). In other words, the brackets 16 exert a force upon the radiator 14 which drives the radiator toward the lower support 32 (FIG. 1).

In one embodiment of the present invention, the vibration isolator 22 is an independent component which is retained within the aperture 26. The isolator 22 preferably includes a substantially annular member which receives the mounting pin 22 (FIG. 1) while providing a pad section 44 which is located between the radiator 14 and the mounting bracket assembly 16. The vibration isolator 24 engages the radiator mounting pin 26 while applying a force upon the upper portion 28 of the radiator 14 through the pad section 44. A rigid, yet vibration isolating retention is thereby achieved.

Referring to FIG. 3, another embodiment of a mounting bracket assembly 16' is disclosed. The mounting bracket assembly 16' includes the features of the bracket described above. The mounting bracket assembly 16' further includes a retainer 46. The retainer 46 is preferably a hook-like member which extends from the mounting bracket 20 in a cantilevered arrangement to retain vehicle conduits, cables, hood rods or the like.

The ribs 42 extend generally perpendicularly from the planar surface 44 of the mounting bracket 20 to provide a mesh-like structure which increase the structural rigidity of the bracket. The ribs 42 include an outer rib 42a which extends about the outer periphery of the bracket 20 and an opening rib 42b which extends about opening 24 formed in each bracket 20. Radial ribs 43c preferably extend radially from the opening ribs 42 and join the outer rib 42a. The ribs 42 do not traverse angular sections of the bracket 20, but follow the contour of the planar surface 44 extend from the surface of the bracket to increase the rigidity and the strength thereof. That is, the ribs 42 are not webs which typically span or interconnect the sections of the bracket 20 which are angled relative to one another such as defining the step of the bracket 20.

Referring to FIG. 4, yet another embodiment of a mounting bracket assembly 16" is disclosed. The mounting bracket assembly 16' includes the features of the bracket described above while providing a vertical mounting surface 48 for mounting to a vertical vehicle frame member (not shown).

In one method of manufacturing the mounting bracket assembly 16 of the present invention, the vibration isolator 24 is formed as an independent component which is assembled into the opening 26. In another method of manufacture according to the present invention, the bracket 16 is formed by a two-shot molding operation in which the vibration isolator 24 is formed integrally to the mounting bracket assembly 16.

A two-shot multi-barrel molding process is preferably provided for manufacturing the mounting bracket according to the present invention. An example molding method preferably includes a first cavity to receive a first material such as the glass-filled polypropylene. The first cavity defines the mounting bracket portion only. After the first material is injected into the first cavity, and prior to complete curing of the first material, the mold is shifted to form a second cavity. The second mold cavity defines the mounting bracket portion and the vibration isolator portion. The second material is then injected into the second cavity, the second material fills the vacant area in the second mold cavity to form the vibration isolator. As the second material essentially overmolds the first material, the second material chemically bonds with the partially cured first material. The vibration isolator portion is thus integrally formed with the mounting bracket portion.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A mounting bracket assembly for attaching a vehicle radiator assembly to a vehicle member comprising:
a non-metallic mounting bracket having an opening, said bracket having a multiple of reinforcement ribs, said mounting bracket is formed of a glass-filled polypropylene; and
a vibration isolator mounted within said opening.

2. The mounting bracket assembly as recited in claim 1, wherein said vibration isolator is formed of a thermoplastic rubber.

3. The mounting bracket assembly as recited in claim 1, wherein said vibration isolator is substantially annular.

4. The mounting bracket assembly as recited in claim 3, wherein said vibration isolator includes a pad section engageable with said radiator.

5. The mounting bracket assembly as recited in claim 1, wherein said mounting bracket is substantially step-shaped.

6. The mounting bracket assembly as recited in claim 1, wherein said vibration isolator is integrally molded with said mounting bracket.

7. The mounting bracket assembly as recited in claim 1, wherein said multiple of reinforcement ribs extend from a generally planar surface of said non-metallic mounting bracket and follow the contour of the planar surface.

8. A mounting bracket assembly for attaching a vehicle radiator assembly to a vehicle member comprising:
a substantially step shaped mounting bracket formed of a glass-filled polypropylene, said mounting bracket having an opening and a multiple of reinforcement ribs; and
a substantially annular vibration isolator having a pad segment, said vibration isolator mounted within said opening.

9. The mounting bracket assembly as recited in claim 8, wherein said vibration isolator is formed of a thermoplastic rubber.

10. The mounting bracket assembly as recited in claim 8, wherein said vibration isolator is integrally molded with said mounting bracket.

11. The mounting bracket assembly as recited in claim 8, wherein said multiple of reinforcement ribs extend from a planar surface of said non-metallic mounting bracket and follow the contour of the planar surface.

12. A vehicle radiator assembly comprising:
a radiator having a mounting pin extending from an upper portion thereof;
a substantially step-shaped non-metallic mounting bracket defining an opening, said mounting bracket having a multiple of reinforcement ribs said mounting bracket is formed of a glass-filled polypropylene; and
a substantially annular vibration isolator having a pad section, said vibration isolator mounted within said opening, said mounting bracket attached to a vehicle member such that said pad section exerts a force upon said upper portion of said radiator.

13. The vehicle radiator assembly as recited in claim 12, wherein said vibration isolator is formed of a thermoplastic rubber.

14. The vehicle radiator assembly as recited in claim 12, wherein said vibration isolator is integrally molded with said mounting bracket.

15. The vehicle radiator assembly as recited in claim 12, wherein said multiple of reinforcement ribs extend from a planar surface of said non-metallic mounting bracket and follow the contour of the planar surface.

16. A mounting bracket assembly for attaching a vehicle radiator assembly to a vehicle member comprising:
a non-metallic mounting bracket having an opening said bracket having a multiple of reinforcement ribs said multiple of reinforcement ribs comprise an outer rib which extends about an outer periphery of said non-metallic mounting bracket; and
a vibration isolator mounted within said opening.

17. The mounting bracket assembly as recited in claim 16, wherein said multiple of reinforcement ribs comprise an opening rib which extends about said opening.

18. The mounting bracket assembly as recited in claim 17, further comprising a plurality of radial ribs joining said opening rib and said outer rib.

19. A mounting bracket assembly for attaching a vehicle radiator assembly to a vehicle member comprising:

a non-metallic mounting bracket having an opening, said bracket having a multiple of reinforcement ribs said multiple of reinforcement ribs extend perpendicularly from a generally planar surface of said non-metallic mounting bracket for a generally equal distance and follow the contour of the planar surface; and a vibration isolator mounted within said opening.

20. A mounting bracket assembly for attaching a vehicle radiator assembly to a vehicle member comprising:

a substantially step shaped mounting bracket formed of a glass-filled polypropylene said mounting bracket having an opening and a multiple of reinforcement ribs said multiple of reinforcement ribs extend perpendicularly from a generally planar surface of said non-metallic mounting bracket for a generally equal distance and follow the contour of the planar surface; and a substantially annular vibration isolator having a pad segment, said vibration isolator mounted within said opening.

21. A vehicle radiator assembly comprising:

a radiator having a mounting pin extending from an upper portion thereof;

a substantially step-shaped non-metallic mounting bracket defining an opening, said mounting bracket having a multiple of reinforcement ribs said multiple of reinforcement ribs extend perpendicularly from a generally planar surface of said non-metallic mounting bracket for a generally equal distance and follow the contour of the planar surface; and a substantially annular vibration isolator a pad section, said vibration isolator mounted within said opening said mounting bracket attached to a vehicle member such that said pad section exerts a force upon said upper portion of said radiator, said multiple of reinforcement ribs extend perpendicularly from a generally planar surface of said non-metallic mounting bracket for a generally equal distance and follow the contour of the planar surface.

22. A mounting bracket assembly for attaching a vehicle radiator assembly to a vehicle member comprising:

a non-metallic mounting bracket having an opening, said bracket having a multiple of reinforcement ribs;

a vibration isolator mounted within said opening; and a retainer extending in a cantilever arrangement from said mounting bracket.

23. The mounting bracket assembly as recited in claim 22, wherein said retainer includes a hook-like member.

24. A mounting bracket assembly for attaching a vehicle radiator assembly to a vehicle member comprising:

a substantially step shaped mounting bracket formed of a glass-filled polypropylene, said mounting bracket having an opening and a multiple of reinforcement ribs;

a substantially annular vibration isolator having a pad segment, said vibration isolator mounted within said opening; and a retainer extending in a cantilever arrangement from said mounting bracket.

25. The mounting bracket assembly as recited in claim 24, wherein said retainer includes a hook-like member.

26. A vehicle radiator assembly comprising:

a radiator having a mounting pin extending from an upper portion thereof;

a substantially step-shaped non-metallic mounting bracket defining an opening, said mounting bracket having a multiple of reinforcement ribs;

a substantially annular vibration isolator having a pad section, said vibration isolator mounted within said opening, said mounting bracket attached to a vehicle member such that said pad section exerts a force upon said upper portion of said radiator; and a retainer extending in a cantilever arrangement from said mounting bracket.

27. The mounting bracket assembly as recited in claim 26, wherein said retainer includes a hook-like member.

* * * * *

UNITED STATES PATENT AND TRADEMARK OFFICE
CERTIFICATE OF CORRECTION

PATENT NO. : 6,675,921 B2
DATED : January 13, 2004
INVENTOR(S) : Brown

It is certified that error appears in the above-identified patent and that said Letters Patent is hereby corrected as shown below:

Column 5,
Line 38, please insert -- having -- after "isolator" and before "a".
Line 39, please insert -- , -- after "opening".

Signed and Sealed this

Ninth Day of March, 2004

JON W. DUDAS
*Acting Director of the United States Patent and Trademark Office*